United States Patent
M N et al.

(10) Patent No.: US 12,043,408 B2
(45) Date of Patent: Jul. 23, 2024

(54) AIRCRAFT HARD LANDING INDICATOR

(71) Applicant: GOODRICH CORPORATION, Charlotte, NC (US)

(72) Inventors: Hemanth M N, Hassan (IN); Basavaraj Bodki, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/115,159

(22) Filed: Feb. 28, 2023

(65) Prior Publication Data
US 2024/0182182 A1    Jun. 6, 2024

(30) Foreign Application Priority Data

Dec. 5, 2022   (IN) .............................. 202241070156

(51) Int. Cl.
*B64D 45/00*   (2006.01)
*B64C 25/34*   (2006.01)
*B64C 25/58*   (2006.01)

(52) U.S. Cl.
CPC .............. *B64D 45/00* (2013.01); *B64C 25/34* (2013.01); *B64C 25/58* (2013.01); *B64D 2045/008* (2013.01)

(58) Field of Classification Search
CPC .... B64D 2045/008; B64D 45/00; B64C 25/58
See application file for complete search history.

(56) References Cited

U.S. PATENT DOCUMENTS

| | | | | |
|---|---|---|---|---|
| 3,223,069 | A * | 12/1965 | Albright | D05B 23/00 116/272 |
| 3,517,550 | A | 6/1970 | Leventhal | |
| 8,616,146 | B2 | 12/2013 | Martin et al. | |
| 2010/0288878 | A1 * | 11/2010 | Bennett | B64C 25/34 702/50 |
| 2011/0180360 | A1 * | 7/2011 | Martin | F16F 9/3264 188/266.8 |
| 2011/0214601 | A1 * | 9/2011 | Martin | B64D 45/00 116/203 |
| 2013/0264417 | A1 | 10/2013 | Devillers et al. | |
| 2018/0304998 | A1 * | 10/2018 | Cusworth | B64C 25/001 |

FOREIGN PATENT DOCUMENTS

IN       201302074       9/2015

OTHER PUBLICATIONS

European Patent Office, European Search Report dated May 7, 2024 in Application No. 23211570.9.

* cited by examiner

*Primary Examiner* — Tye William Abell
(74) *Attorney, Agent, or Firm* — SNELL & WILMER L.L.P.

(57) ABSTRACT

A hard landing indicator assembly is disclosed herein. The hard landing indicator assembly includes a pressure relief valve, a hydraulic tube having a first end and a second end, the first end coupled to the pressure relief valve, and a plunger having a top portion and a shaft, the plunger disposed in the hydraulic tube, wherein a portion of the shaft is a hard landing indicator that extends outward from the hydraulic tube in response to a hard landing event.

19 Claims, 6 Drawing Sheets

AIRCRAFT HARD LANDING INDICATOR

CROSS-REFERENCE TO RELATED APPLICATIONS

This application claims priority to, and the benefit of, India Patent Application No. 202241070156 (DAS CODE: 22FA), filed Dec. 5, 2022, and titled "AIRCRAFT HARD LANDING INDICATOR," which is incorporated by reference herein in its entirety for all purposes.

FIELD

The present disclosure generally relates aircraft systems, and more specifically, to landing systems.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. The shock struts used in the landing gear of aircraft generally are subject to more demanding performance specifications than many ground vehicle shock absorbers. In particular, shock struts control motion of the landing gear, and absorb and dampen loads imposed on the gear during braking, landing, taxiing, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, such as a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

While shock struts may effectively absorb energy during aircraft landing events, "hard-landing events" may result in structural damage to the aircraft and/or landing gear assemblies. A landing event is conventionally deemed "hard" (i.e., a hard-landing event) when the pilot declares the landing event to be such. In other words, there is a level of subjectivity in determining whether a landing event is a hard-landing. There are various problems with this method of subjectivity. For example, if the pilot declares a hard-landing event, the aircraft must be inspected, tested, and/or analytically reviewed with landing data to verify that the aircraft structures and/or landing gear assemblies were not overloaded. The inspection process and/or analytical review process generally results in the aircraft being out of commission for a period of time and involves the expenditure of time and resources. Often the inspection process results in no structural damage found. Alternatively, if a hard-landing event occurs without the pilot identifying/declaring it as such, structural damage may go unnoticed. For at least these reasons, conventional solutions for detection of hard landings often may not produce reliable results.

SUMMARY

Disclosed herein is a hard landing indicator assembly. The hard landing indicator assembly includes a pressure relief valve, a hydraulic tube having a first end and a second end, the first end coupled to the pressure relief valve, and a plunger having a top portion and a shaft, the plunger disposed in the hydraulic tube, wherein a portion of the shaft is a hard landing indicator that extends outward from the hydraulic tube in response to a hard landing event.

In various embodiments, the hard landing indicator assembly further includes a liquid disposed within the hydraulic tube between the pressure relief valve and the top portion of the plunger, the liquid applying a first force in a first direction to the top portion of the plunger and a spring coupled to the plunger, the spring applying a second force in a second direction to the top portion of the plunger, the second force being equal to the first force and the second direction being opposite the first direction. In various embodiments, the hard landing indicator further includes a gland nut coupled to the send end of the hydraulic tube, the hard landing indicator extending through the gland nut while remaining within the gland nut in response to the first force being equal to the second force. In various embodiments, the pressure relief valve is configured to allow an amount of liquid into the hydraulic tube during a hard landing event and the hard landing indicator is configured to extend outward from the gland nut in response to the amount of liquid entering the hydraulic tube. In various embodiments, the amount of liquid increases the first force to be greater than the second force, the first force pushing the plunger in the first direction causing the hard landing indicator to extend through the gland nut.

In various embodiments, the hydraulic tube has an inner surface extending from the first end to the second end, the top portion of the plunger contacting the inner surface of the hydraulic tube. In various embodiments, the hard landing indicator assembly further includes a first dynamic seal seated in the top portion of the plunger and configured to contact the inner surface of the hydraulic tube, and a second dynamic seal seated in the gland nut and configured to contact the shaft of the plunger. In various embodiments, the hard landing indicator assembly further includes a stop coupled to the inner surface of the hydraulic tube between the first end and the second end of the hydraulic tube, the stop configured to prevent the plunger from moving toward the first end of the hydraulic tube.

Also disclosed herein is a landing gear assembly. The landing gear assembly includes a shock strut, a wheel assembly coupled to the shock strut, and a hard landing indicator assembly coupled to the shock strut. The hard landing indicator assembly includes a pressure relief valve, a hydraulic tube having a first end and a second end, the first end coupled to the pressure relief valve, a gland nut coupled to the second end of the hydraulic tube, the gland nut having an orifice therethrough, and a plunger having a top portion and a shaft, the plunger disposed in the hydraulic tube with the shaft extending through the orifice of the gland nut, where a distal portion of the shaft is a hard landing indicator that that is configured to extend outward from the hydraulic tube through the orifice in response to a hard landing event.

In various embodiments, the hard landing indicator assembly further includes a liquid disposed within the hydraulic tube between the pressure relief valve and the top portion of the plunger, the liquid applying a first force in a first direction to the top portion of the plunger and a spring coupled to the plunger, the spring applying a second force in a second direction to the top portion of the plunger, the second force being equal to the first force and the second direction being opposite the first direction. In various embodiments, the hard landing indicator is configured to remain within the gland nut in response to the first force being equal to the second force. In various embodiments, the pressure relief valve is configured to allow an amount of liquid into the hydraulic tube and the hard landing indicator is configured to extend out of the gland nut in response to the amount of liquid entering the hydraulic tube.

In various embodiments, the amount of liquid increases the first force to be greater than the second force, the first force pushing the plunger in the first direction causing the hard landing indicator to extend through the gland nut. In various embodiments, the hydraulic tube has an inner surface extending from the first end to the second end, the top portion of the plunger contacting the inner surface of the hydraulic tube. In various embodiments, the hard landing indicator assembly further includes a first dynamic seal seated in the top portion of the plunger and configured to contact the inner surface of the hydraulic tube and a second dynamic seal seated in the gland nut and configured to contact the shaft of the plunger. In various embodiments, the hard landing indicator assembly further includes a stop coupled to the inner surface of the hydraulic tube between the first end and the second end of the hydraulic tube, the stop configured to prevent the plunger from moving toward the first end of the hydraulic tube.

Also disclosed herein is a hard landing indicator assembly. The hard landing indicator assembly includes a pressure relief valve, a gland nut, a hydraulic tube having a first end and a second end, the first end coupled to the pressure relief valve and the second end coupled to the gland nut, a plunger having a top portion and a shaft, the plunger disposed in the hydraulic tube, where a portion of the shaft is a hard landing indicator that is configured to extend outward from the hydraulic tube in response to a hard landing event, a liquid disposed between the pressure relief valve and the plunger, the liquid having a first pressure applying a first force to the plunger in a first direction, and a spring disposed between the plunger and the gland nut, the spring applying a second force to the plunger in a second direction opposite the first direction.

In various embodiments, the pressure relief valve is configured to allow an amount of liquid into the hydraulic tube, wherein the amount of liquid increases the first pressure and the first force causing the hard landing indicator to extend through the gland nut and extend out from the hydraulic tube. In various embodiments, the hydraulic tube has an inner surface extending from the first end to the second. In various embodiments, the hard landing indicator assembly further includes a first dynamic seal seated in the top portion of the plunger and configured to contact the inner surface of the hydraulic tube and a second dynamic seal seated in the gland nut and configured to contact the shaft of the plunger. In various embodiments, the hard landing indicator assembly further includes a stop coupled to the inner surface of the hydraulic tube between the first end and the second end of the hydraulic tube, the stop configured to prevent the plunger from moving toward the first end of the hydraulic tube.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a hard landing indicator for use in landing gear in an aircraft. The hard landing indicator may aid ground support staff in identifying hard landing events. The term hard landing has several definitions including referring to a report or a declaration of a landing event by a pilot, where it is suspected that the landing gear or airframe structure, was possibly subjected to damage. Additionally, a hard landing declaration is not limited to an aircraft touchdown event alone and can have various instances that can be termed as a hard landing. For example, hard landing may refer to an aircraft landing on the flat tires, an aircraft rolling off the runway, a heavily rolled landing of an aircraft, etc.

As disclosed herein the hard landing indicator includes, in various embodiments, a pressure relief valve, hydraulic tube, plunger (e.g., indicator), dynamic seals, spring, and gland. In various embodiments, the pressure relief valve is installed at the metering pin base. In various embodiments, oil is filled inside the hydraulic tube and the oil-filled hydraulic tube is connected between the pressure relief valve and the hard landing indicator system. In various embodiments, the hard landing indicator system comprises a spring to load the plunger, a plunger (e.g., indicator), a dynamic seal to prevent any leakage from the hydraulic tube, and the gland to hold the plunger. In various embodiments, the hydraulic tube has a volume that is completely filled with oil such that an additional volume of oil that enters from the shock strut through the pressure relief valve will push the plunger (e.g., indicator) against the spring and in turn the red painted portion of the plunger will pop out of the gland, thereby exposing it to the ground support personnel.

In a hard landing event, the pressure inside the shock strut increases drastically beyond the operating range, thereby causing the pressure relief valve to open. Due to this surge in the pressure, an additional volume of oil enters the hydraulic tube until the plunger bottoms. This additional oil which enters the hydraulic tube forces the plunger (e.g., indicator) against the spring, thereby exposing the red paint at the lower end of the plunger. This visibly detectable indicator (e.g., red paint) is moved from a non-indicating position to an indicating position.

Since the pressure relief valve is unidirectional and does not allow oil to flow back into the shock strut, the indicator (e.g., red paint) will remain exposed. This plunger (e.g., indicator) may be returned to its original position with the help of ground support staff by removing the excess oil from the hydraulic tube. This way, it prevents someone from physically forcing the plunger back into the gland.

Along with a pressure relief valve, a pressure transducer can be installed to read the pressure inside the shock strut, which can be converted to a load or force. Thus, when the indicator indicates the occurrence of a hard landing event, the data can be obtained from the pressure transducer and examined to determine if the internal loads inside the strut were enough to warrant additional or more costly inspections.

The hard landing indicator disclosed herein provides a robust and cost effective solution that may be implemented in landing gear assemblies of all sizes. Furthermore, the hard landing indicator disclosed herein may be serviced faster and with less effort than existing hard landing indicators without reducing the safety of the aircraft.

Figure 1:
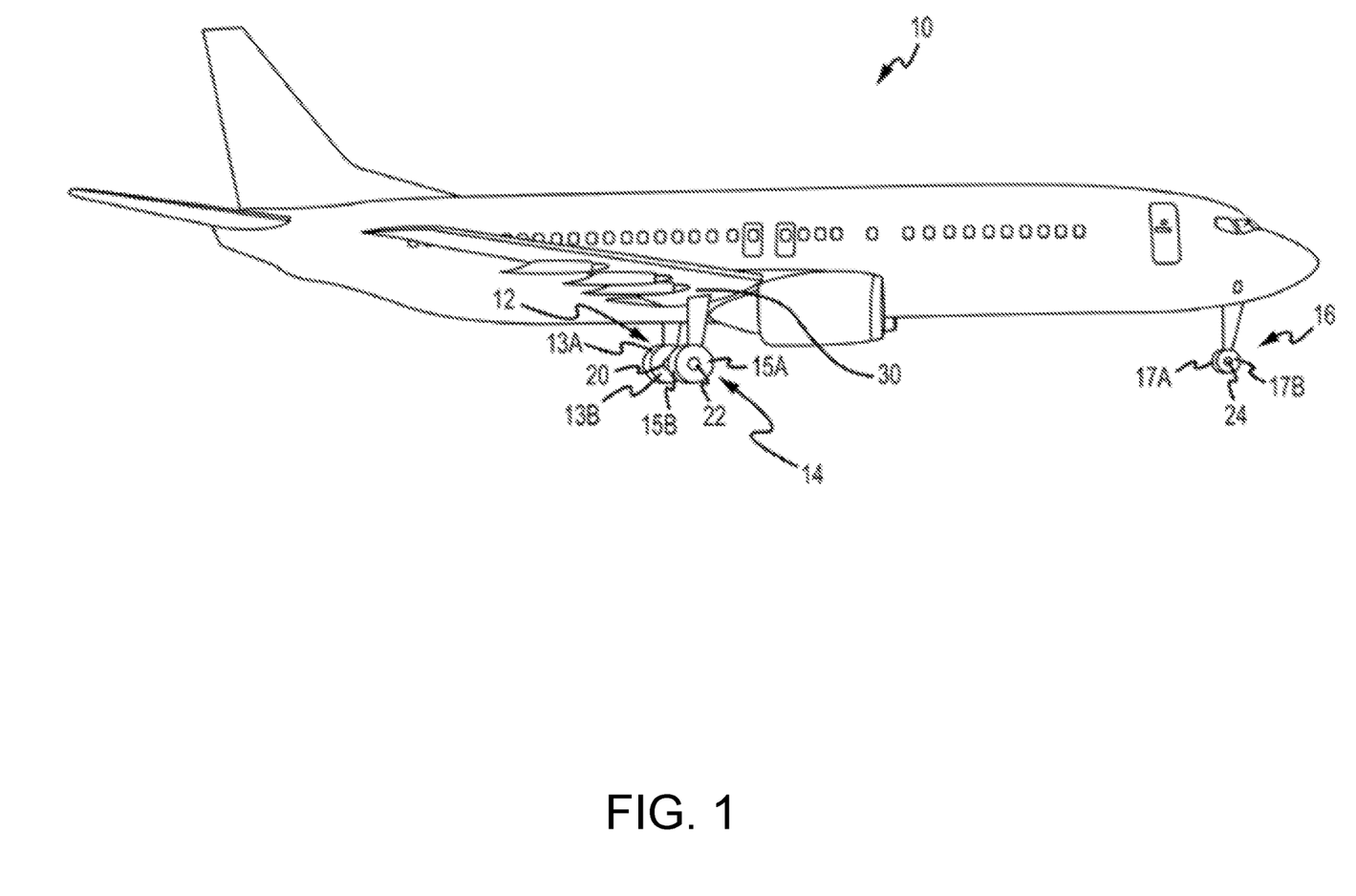
FIG. 1 illustrates an exemplary aircraft having landing gear, in accordance with various embodiments.

Referring now to FIG. 1, illustrated is an aircraft 10 including landing gears, in accordance with various embodiments. Aircraft 10 may include landing gear such as main landing gear 12, main landing gear 14 and nose landing gear 16. Main landing gear 12, main landing gear 14, and nose landing gear 16 may generally support aircraft 10 when aircraft 10 is not flying, allowing aircraft 10 to taxi, take off, land, and brake without damage. Main landing gear 12 may include wheel 13A and wheel 13B coupled by an axle 20. Main landing gear 14 may include wheel 15A and wheel 15B coupled by an axle 22. Nose landing gear 16 may include nose wheel 17A and nose wheel 17B coupled by an axle 24. In various embodiments, aircraft 10 may comprise any number of landing gears and each landing gear may comprise any number of wheels. Main landing gear 12, main landing gear 14, and nose landing gear 16 may each be retracted for flight.

Figure 2A:
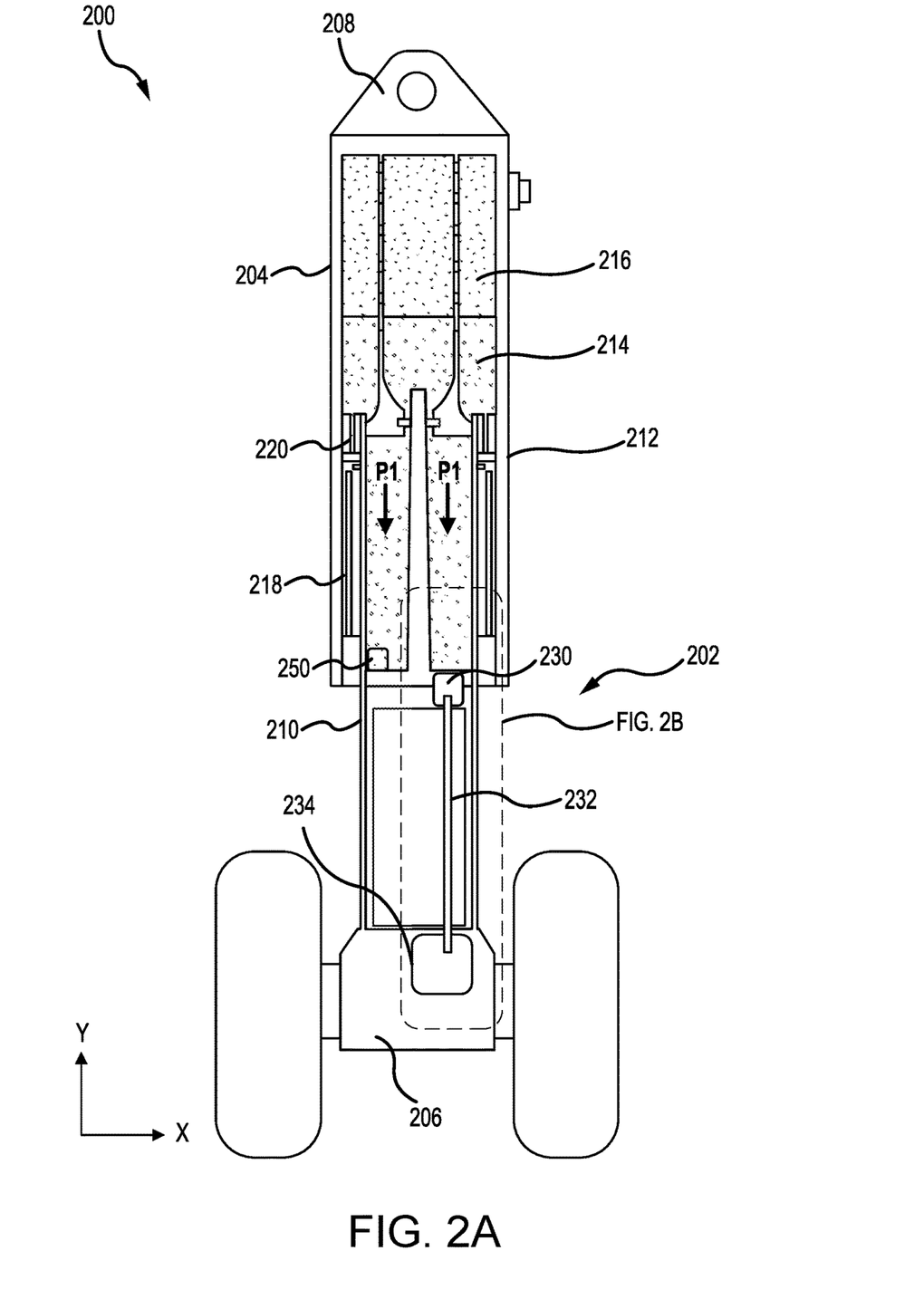
FIGS. 2A and 2B illustrate an aircraft hard landing indicator, in accordance with various embodiments.
Figure 2B:
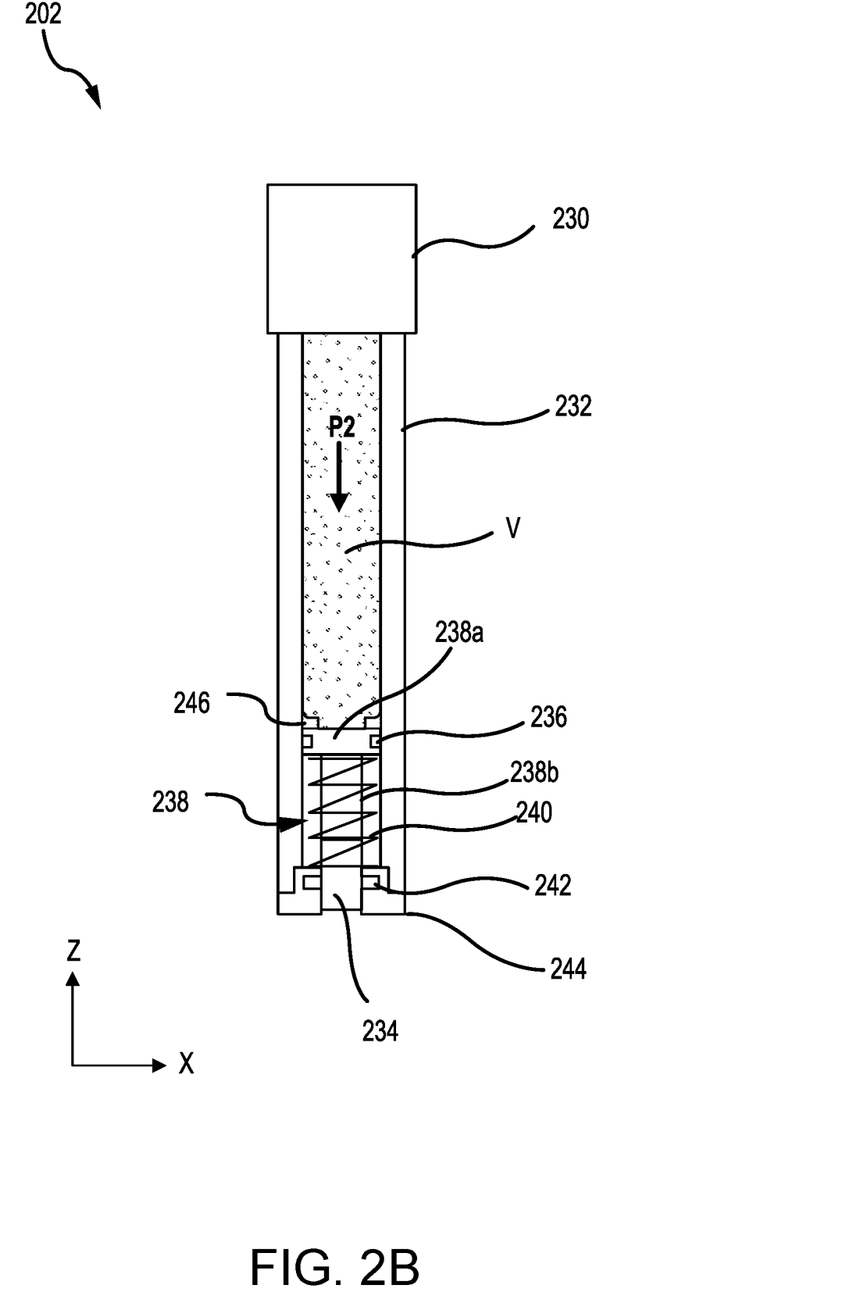

Referring now to FIGS. 2A and 2B, a landing gear assembly 200 including a hard landing indicator assembly 202 in a non-indicating position are illustrated, in accordance with various embodiments. FIG. 2A illustrates a cross section of landing gear assembly 200 including hard landing indicator in the non-indicating position. FIG. 2B illustrates an enlarged cross section of hard landing indicator assembly 202 in the non-indicating position. Landing gear assembly 200 further includes a shock strut 204, a wheel assembly 206, and a landing gear attachment structure 208. Shock strut 204 may be mechanically coupled to wheel assembly 206 and to landing gear attachment structure 208. In various embodiments, shock strut 204 may be configured to absorb and dampen forces transmitted by wheel assembly 206 to an aircraft (e.g., aircraft 10) via landing gear attachment structure 208.

Shock strut 204 may comprise, for example, a piston 210 and a cylinder 212. Cylinder 212 may be configured to receive piston 210 in a manner that allows the two components to telescope together and absorb and dampen forces transmitted by wheel assembly 206. In various embodiments, a liquid 214, such as a hydraulic fluid or oil, is located within cylinder 212. Cylinder 212 and piston 210 may, for example, be configured to seal such that liquid 214 contained within cylinder 212 is prevented from leaking as piston 210 translates relative to cylinder 212. Further, cylinder 212 may be configured to contain a gas 216 such as nitrogen gas or air. Shock strut 204 may comprise a proximal end and a distal end, wherein the distal end is opposite the proximal end, the distal end being the end of the shock strut closest to a wheel or wheel assembly of a vehicle, such as wheel assembly 206, for example. A gas chamber (e.g., a chamber containing gas 216) may be positioned above an oil chamber (e.g., containing liquid 214), referred to as an "air-over-oil" arrangement, or vice versa, where the term "above" in this context means in the direction of the proximal end of the shock strut. The shock strut 204 may further include a recoil chamber 218 having a bearing 220, including a plurality of annular holes, through which recoil chamber 218 is fluidly connected to the oil chamber. Similarly, cylinder 212 and piston 210 may be sealed such that gas 216 is prevented from leaking as piston 210 moves relative to cylinder 212. Accordingly, shock strut 204 may comprise a pressurized environment within cylinder 212.

In various embodiments, liquid 214 within shock strut 204 is pressurized to a pressure P. During taxi, takeoff, landing, braking, and other movements of aircraft 10, shock strut 204 absorb and dampen forces transmitted by wheel assembly 206 to aircraft 10. This may be accomplished by piston 210 and cylinder 212 relative movement (e.g., telescoping) with respect to each other. As piston 210 and cylinder 212 move relative to each other pressure P1 within shock strut 204 may increase, acting as a shock absorber. For each landing gear assembly 200, and more specifically, for each shock strut 204 there is a threshold pressure that, if exceeded, may cause damage to shock strut 204, landing gear assembly 200, and/or aircraft 10. The threshold pressure may be referred to as a hard landing threshold. Accordingly, if pressure P1 within shock strut 204 is below the hard landing threshold, then a hard landing event did not occur. However, if pressure P1 within shock strut 204 is above the hard landing threshold, then a hard landing event occurred and hard landing indicator assembly 202 is triggered providing an indication that the hard landing event occurred. Landing gear assembly 200 and shock strut 204, among other components, may be inspected and serviced in response to the hard landing event occurring.

Hard landing indicator assembly 202 includes a pressure relief valve 230, a hydraulic tube 232, and a hard landing indicator 234. Pressure relief valve 230 is coupled to the oil chamber, containing liquid 214, at a proximal end and to hydraulic tube 232 at a distal end that is opposite the proximal end. Generally, pressure relief valve 230 restricts a flow of liquid 214 from the oil chamber to hydraulic tube 232. However, pressure relief valve 230 allows the flow of liquid 214 into hydraulic tube 232 in response to pressure P1 exceeding the hard landing threshold. In various embodiments, pressure relief valve 230 may be calibrated for use with each configuration of aircraft 10 and landing gear assembly 200 resulting in a different hard landing threshold pressure for each different configuration.

Referring now to FIG. 2B, hard landing indicator assembly 202 further includes a volume V of liquid 214, a first dynamic seal 236, a plunger 238, a spring 240, a second dynamic seal 242, and a gland nut 244. Plunger 238 includes a top portion 238a and a shaft 238b, the top portion 238a being coupled to the shaft 238b. In various embodiments, top portion 238a and shaft 238b may be a single monolithic member forming plunger 238. In various embodiments, top portion 238a contacts an inner surface of hydraulic tube 232 providing a seal to prevent a flow of liquid 214 from exiting hydraulic tube 232 through plunger 238. In various embodiments, top portion 238a includes a channel in which first dynamic seal 236 is seated. First dynamic seal 236 may improve the seal of plunger 238 further preventing the flow of liquid 214. Spring 240 is coupled to plunger 238 and disposed around shaft 238b and under top portion 238a of plunger 238. Spring 240 exerts a force on plunger 238, pressing upward (e.g., the Z direction) on plunger 238 and maintaining a pressure P2 of liquid 214 within volume V of hydraulic tube 232.

Gland nut 244 is coupled to the distal end of hydraulic tube 232 and includes an opening through which shaft 238b of plunger 238 can pass. Specifically, hard landing indicator 234 (e.g., a bottom portion of shaft 238b) passes through gland nut 244 in response to a hard landing. Hard landing indicator 234 may be colored or marked to provide a clear indication that a hard landing occurred. In various embodiments hard landing indicator 234 may be colored red. In various embodiments, hard landing indicator 234 may be a bright, neon, or fluorescent color. Second dynamic seal 242 provides a seal between plunger 238 and gland nut 244 allowing plunger 238 to slide through gland nut 244 while maintaining liquid 214 within hydraulic tube 232 and other liquids out hydraulic tube 232. In the non-indicating position, spring 240 presses against gland nut 244 at the distal end and against top portion 238a of plunger 238 at the proximal end. Stops 246 prevent plunger 238 from moving upward (e.g., in the positive Z direction).

Liquid 214 in volume V of hydraulic tube 232 is calibrated to a pressure P2. At pressure P2, hard landing indicator assembly 202 may be calibrated to so that spring 240 exerts an upward force (e.g., the positive Z direction) that is equal to a downward force (e.g., the negative Z direction) exerted by liquid 214 at pressure P2. The pressure of volume V within hydraulic tube 232 may remain at pressure P2 so long as no liquid 214 flows through pressure relief valve 230.

Figure 3A:
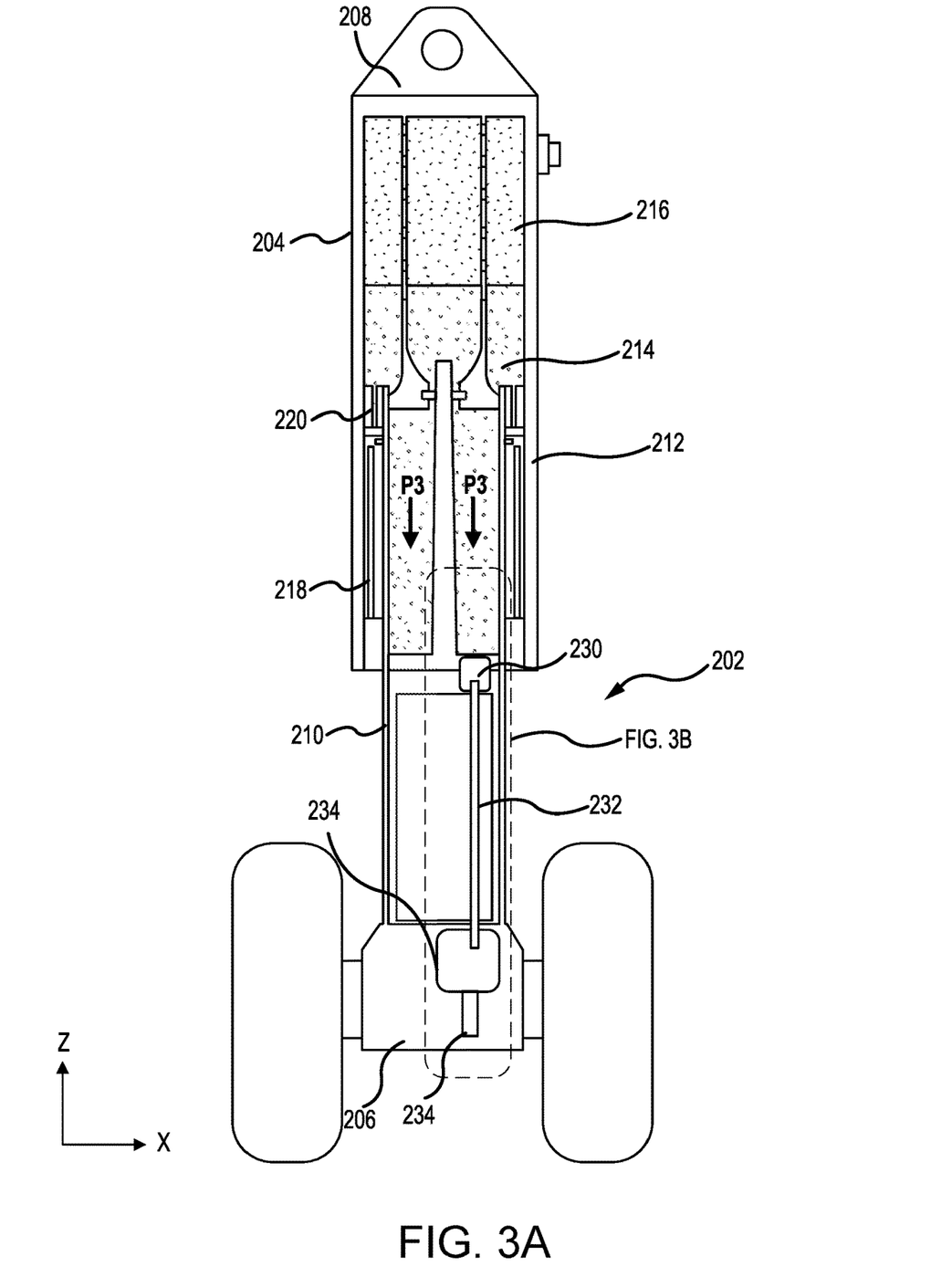
FIGS. 3A and 3B illustrate an aircraft hard landing indicator, in accordance with various embodiments.
Figure 3B:
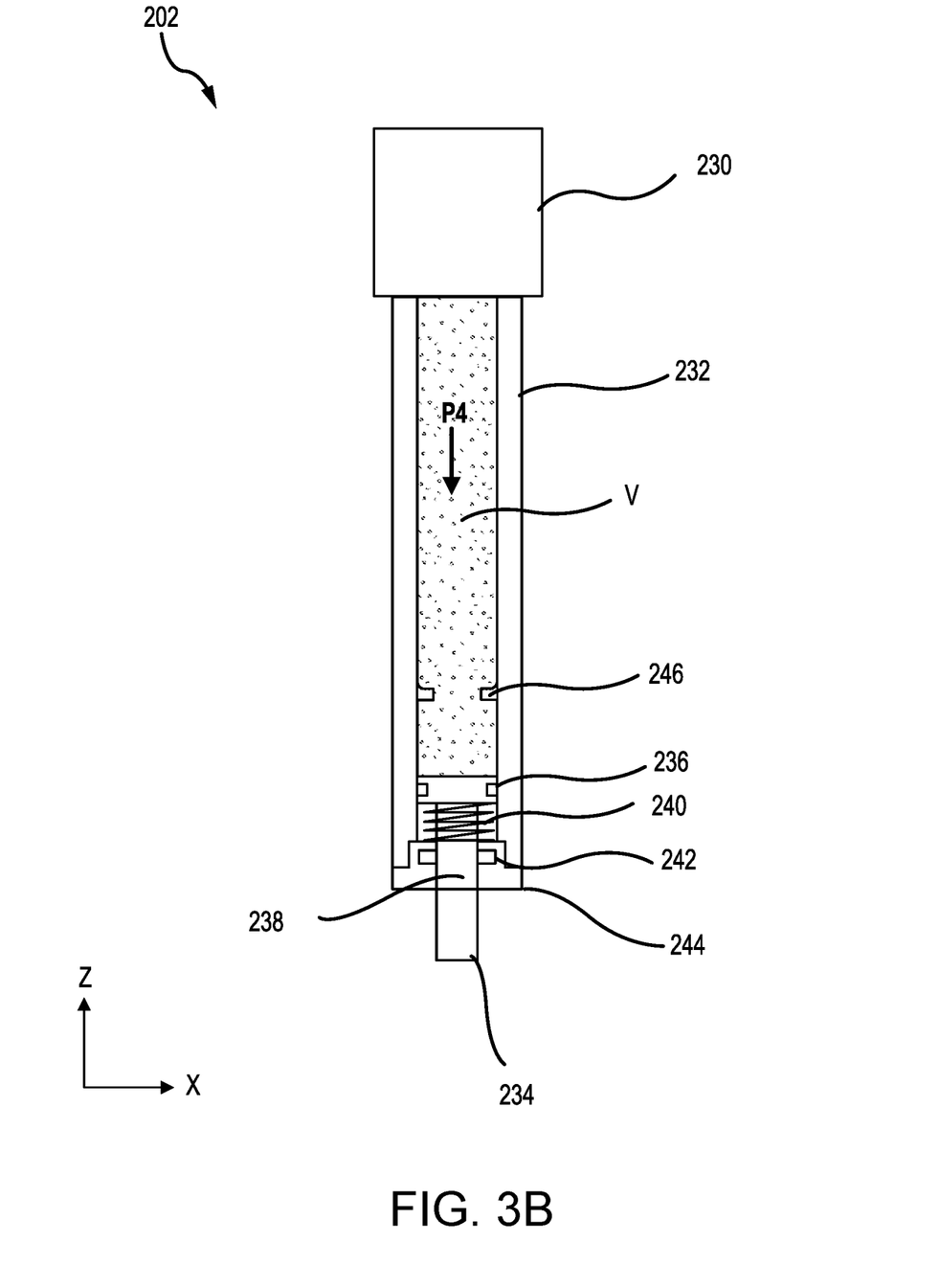

Referring now to FIGS. 3A and 3B, landing gear assembly 200 including hard landing indicator assembly 202 in an indicating position are illustrated, in accordance with various embodiments. FIG. 3A illustrates a cross section of landing gear assembly 200 including hard landing indicator in the indicating position. FIG. 3B illustrates an enlarged cross section of hard landing indicator assembly 202 in the indicating position. The components of landing gear assembly 200 and hard landing indicator assembly 202 are described above with respect to FIGS. 2A and 2B and may not be repeated here.

During a hard landing event, the pressure in shock strut 204 may increase above the hard landing threshold to a pressure P3, as illustrated in FIG. 3A. The increase to pressure P3 triggers pressure relief valve 230 to allow a flow of liquid 214 from the liquid chamber into hydraulic tube 232. The addition of liquid 214 into hydraulic tube 232 increases the pressure in hydraulic tube to a pressure P4. A force exerted by liquid 214 at pressure P4 overcomes the force of spring 240, moving plunger 238 downward (e.g., in the negative Z direction). The movement of plunger 238 downward pushes hard landing indicator 234 through gland nut 244, exposing hard landing indicator 234.

After the hard landing event, the pressure in shock strut 204 may decrease below pressure P3. However, pressure relief valve 230 does not allow a flow of liquid 214 from hydraulic tube 232 back to shock strut 204. Therefore, pressure P4 is maintained in hydraulic tube 232 such that hard landing indicator 234 remains visible until landing gear assembly 200 is serviced. In various embodiments, hard landing indicator assembly 202 may be reset by removing hydraulic tube 232 to remove excess liquid 214. In various embodiments, hard landing indicator assembly 202 may be reset by removing gland nut 244, spring 240, plunger 238, and liquid 214. After servicing, plunger 238, spring 240, and gland nut 244 may be reseated into hydraulic tube 232 and hydraulic tube 232 may be repressurized to pressure P2 using liquid 214.

In various embodiments, landing gear assembly 200 may further include a pressure transducer 250, shown in FIG. 2A. Pressure transducer 250 may be installed in shock strut 204 to read the pressure inside shock strut 204. The pressure may then be converted to a load or force and the pressure data stored in a memory. The pressure data may be read from pressure transducer 250 during service of landing gear assembly 200 in response to a hard landing event. The data from the pressure transducer may provide more information about the severity of the hard landing event.

Figure 4:
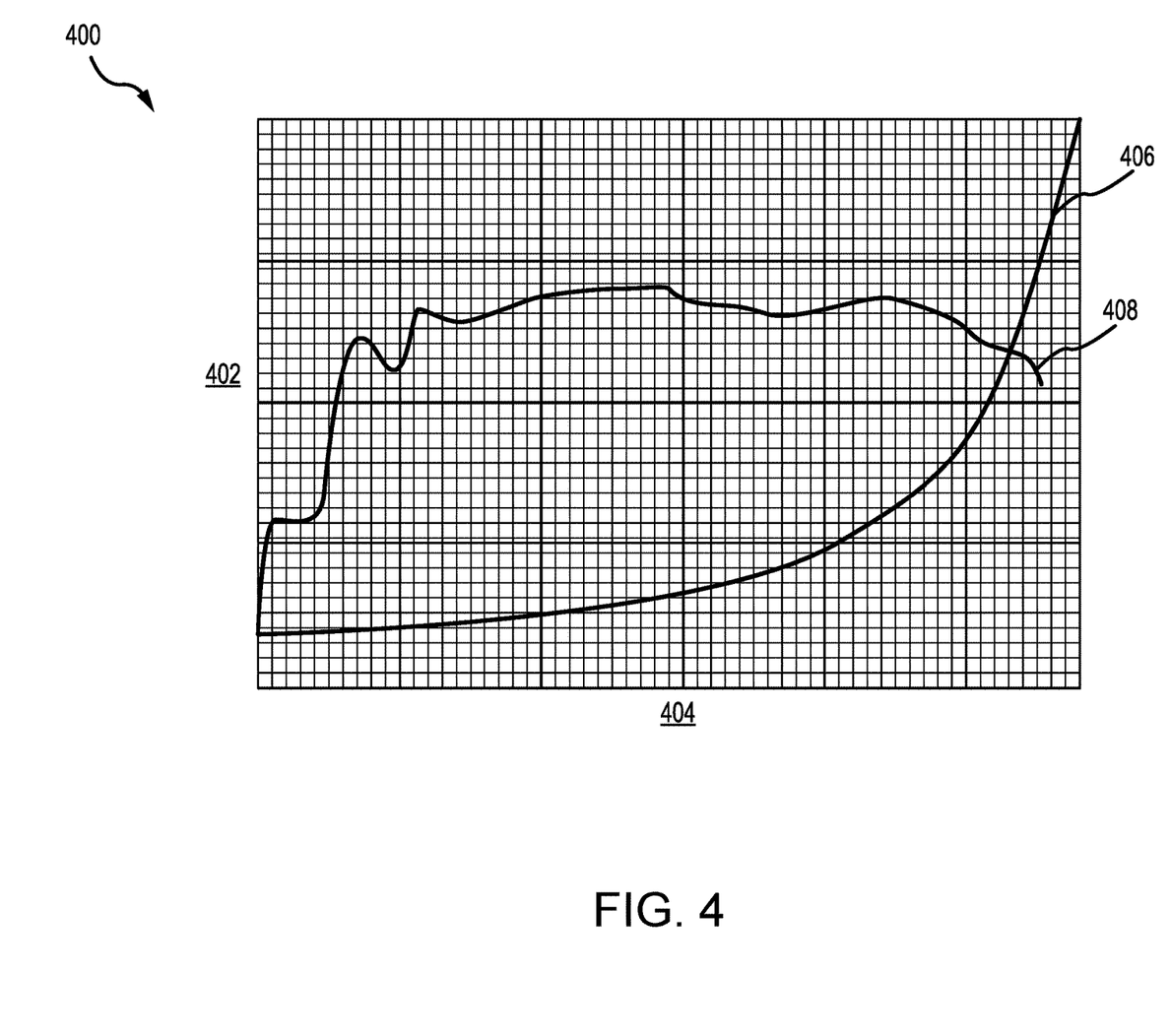
FIG. 4 illustrates a plot of a shock strut load as a function of the shock strut stroke, in accordance with various embodiments.

Referring now to FIG. 4, a plot 400 of a shock strut load 402 as a function of the shock strut stroke 404 is illustrated, in accordance with various embodiments. Plot 400 may be used to determine a calibration setting for pressure relief valve 230. As previously mentioned, each shock strut 204 may have a different calibration setting for pressure relief valve 230. A first line 406 illustrates a static shock strut load 402 increasing as the shock strut stroke 404 increases. Generally, as the stroke 404 of shock strut 204 increases (e.g., along axis 404) the load 402 on shock strut 204 increases in a predictable manner, as illustrated by first line 406. The slope of first line 406 may be different for different shock struts 204. A second line 408 illustrates a dynamic shock strut load 402 as with respect to the increase in shock strut stroke 404. That is, second line 408 illustrates the load 402 on shock strut 204 during a landing event (or a dynamic event). As illustrated, the load 402 may increase dramatically with little to no increase in the stroke of shock strut 204. Again, each shock strut design (e.g., shock strut 204) may have different dynamic characteristics identified by second line 408. A hard landing event may be defined as a specific load 402 for each shock strut by using second line 408. The calibration settings for pressure relief valve 230 may be determined for each different shock strut based on what load defines a hard landing event as provided by second line 408.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A hard landing indicator assembly, comprising:
   a pressure relief valve;
   a hydraulic tube having a first end and a second end, the first end coupled to the pressure relief valve;
   a gland nut coupled to the second end of the hydraulic tube; and
   a plunger having a top portion and a shaft, the plunger disposed in the hydraulic tube, wherein a portion of the shaft is a hard landing indicator that is configured to extend outward from the hydraulic tube in response to an increase in pressure within the hydraulic tube;
   wherein the hard landing indicator extends through the gland nut; and
   wherein the hard landing indicator remains within the gland nut in response to a first force equal to a second force.

2. The hard landing indicator assembly of claim 1, further comprising:
   a liquid disposed within the hydraulic tube between the pressure relief valve and the top portion of the plunger, the liquid applying the first force in a first direction to the top portion of the plunger; and
   a spring coupled to the plunger, the spring applying the second force in a second direction to the top portion of the plunger, the second force being equal to the first force and the second direction being opposite the first direction.

3. The hard landing indicator assembly of claim 1, wherein the pressure relief valve is configured to allow an amount of liquid into the hydraulic tube during a hard landing event; and wherein the hard landing indicator is configured to extend outward from the gland nut in response to the amount of liquid entering the hydraulic tube.

4. The hard landing indicator of claim 3, wherein the amount of liquid increases the first force to be greater than the second force, the first force pushing the plunger in the first direction causing the hard landing indicator to extend through the gland nut.

5. The hard landing indicator assembly of claim 1, wherein the hydraulic tube has an inner surface extending from the first end to the second end, the top portion of the plunger contacting the inner surface of the hydraulic tube.

6. The hard landing indicator assembly of claim 5, further comprising:
   a first dynamic seal seated in the top portion of the plunger and configured to contact the inner surface of the hydraulic tube; and
   a second dynamic seal seated in the gland nut and configured to contact the shaft of the plunger.

7. The hard landing indicator assembly of claim 6, further comprising:
   a stop coupled to the inner surface of the hydraulic tube between the first end and the second end of the hydraulic tube, the stop configured to prevent the plunger from moving toward the first end of the hydraulic tube.

8. A landing gear assembly, comprising:
   a shock strut;
   a wheel assembly coupled to the shock strut; and a hard landing indicator assembly coupled to the shock strut, the hard landing indicator assembly including:
a pressure relief valve;
a hydraulic tube having a first end and a second end, the first end coupled to the pressure relief valve;
a gland nut coupled to the second end of the hydraulic tube, the gland nut having an orifice therethrough; and
a plunger having a top portion and a shaft, the plunger disposed in the hydraulic tube with the shaft extending into the orifice of the gland nut;
wherein a distal portion of the shaft is a hard landing indicator that is configured to extend outward from the hydraulic tube through the orifice in response to a hard landing event.

9. The landing gear assembly of claim 8, wherein the hydraulic tube has an inner surface extending from the first end to the second end, the top portion of the plunger contacting the inner surface of the hydraulic tube.

10. The landing gear assembly of claim 9, the hard landing indicator assembly further comprising:
a first dynamic seal seated in the top portion of the plunger and configured to contact the inner surface of the hydraulic tube; and
a second dynamic seal seated in the gland nut and configured to contact the shaft of the plunger.

11. The landing gear assembly of claim 10, the hard landing indicator assembly further comprising:
a stop coupled to the inner surface of the hydraulic tube between the first end and the second end of the hydraulic tube, the stop configured to prevent the plunger from moving toward the first end of the hydraulic tube.

12. The landing gear assembly of claim 8, the hard landing indicator assembly further comprising:
a liquid disposed within the hydraulic tube between the pressure relief valve and the top portion of the plunger, the liquid applying a first force in a first direction to the top portion of the plunger; and
a spring coupled to the plunger, the spring applying a second force in a second direction to the top portion of the plunger, the second force being equal to the first force and the second direction being opposite the first direction.

13. The landing gear assembly of claim 12, wherein the hard landing indicator is configured to remain within the gland nut in response to the first force being equal to the second force.

14. The landing gear assembly of claim 12, wherein the pressure relief valve is configured to allow an amount of liquid into the hydraulic tube, and wherein the hard landing indicator is configured to extend out of the gland nut in response to the amount of liquid entering the hydraulic tube.

15. The landing gear assembly of claim 14, wherein the amount of liquid increases the first force to be greater than the second force, the first force pushing the plunger in the first direction causing the hard landing indicator to extend through the gland nut.

16. A hard landing indicator assembly, comprising:
a pressure relief valve;
a gland nut;
a hydraulic tube having a first end and a second end, the first end coupled to the pressure relief valve and the second end coupled to the gland nut;
a plunger having a top portion and a shaft, the plunger disposed in the hydraulic tube, wherein a portion of the shaft is a hard landing indicator that is configured to extend outward from the hydraulic tube in response to a hard landing event;
a liquid disposed between the pressure relief valve and the plunger, the liquid having a first pressure applying a first force to the plunger in a first direction; and
a spring disposed between the plunger and the gland nut, the spring applying a second force to the plunger in a second direction opposite the first direction.

17. The hard landing indicator assembly of claim 16, wherein the pressure relief valve is configured to allow an amount of liquid into the hydraulic tube, wherein the amount of liquid increases the first pressure and the first force causing the hard landing indicator to extend through the gland nut and extend out from the hydraulic tube.

18. The hard landing indicator assembly of claim 17, wherein the hydraulic tube has an inner surface extending from the first end to the second, the hard landing indicator assembly further comprising:
a first dynamic seal seated in the top portion of the plunger and configured to contact the inner surface of the hydraulic tube; and
a second dynamic seal seated in the gland nut and configured to contact the shaft of the plunger.

19. The hard landing indicator assembly of claim 18, further comprising:
a stop coupled to the inner surface of the hydraulic tube between the first end and the second end of the hydraulic tube, the stop configured to prevent the plunger from moving toward the first end of the hydraulic tube.

* * * * *